(12) United States Patent
Benco et al.

(10) Patent No.: US 8,000,685 B2
(45) Date of Patent: Aug. 16, 2011

(54) NETWORK SUPPORT FOR DISTINCTIVE VOICEMAIL GREETING

(75) Inventors: David S. Benco, Winfield, IL (US);
Sanjeev Mahajan, Naperville, IL (US);
Baoling S. Sheen, Naperville, IL (US);
Sandra L. True, St. Charles, IL (US)

(73) Assignee: Alcatel Lucent, Paris (FR)

( * ) Notice: Subject to any disclaimer, the term of this patent is extended or adjusted under 35 U.S.C. 154(b) by 838 days.

(21) Appl. No.: 11/151,136

(22) Filed: Jun. 13, 2005

(65) Prior Publication Data

US 2006/0291630 A1 Dec. 28, 2006

(51) Int. Cl.
*H04M 11/10* (2006.01)
(52) U.S. Cl. ............ 455/413; 455/415; 379/88.25; 379/142.06
(58) Field of Classification Search ............ 379/88.2, 379/88.23, 88.22–88.25, 142.06, 207.15; 455/413
See application file for complete search history.

(56) References Cited

U.S. PATENT DOCUMENTS

| 5,278,894 | A | * | 1/1994 | Shaw | 379/88.19 |
| 5,434,906 | A | * | 7/1995 | Robinson et al. | 379/88.23 |
| 5,450,488 | A | * | 9/1995 | Pugaczewski et al. | 379/67.1 |
| 5,475,739 | A | * | 12/1995 | Norimatsu | 379/70 |
| 5,819,046 | A | * | 10/1998 | Johnson | 709/227 |
| 5,892,814 | A | * | 4/1999 | Brisebois et al. | 379/88.24 |
| 5,930,338 | A | * | 7/1999 | McKendry et al. | 379/88.25 |
| 6,201,956 | B1 | * | 3/2001 | Tehan | 455/406 |
| 6,631,181 | B1 | * | 10/2003 | Bates et al. | 379/88.18 |
| 6,795,530 | B1 | * | 9/2004 | Gilbert et al. | 379/76 |
| 6,804,334 | B1 | * | 10/2004 | Beasley et al. | 379/88.17 |
| 7,043,232 | B2 | * | 5/2006 | Pelaez et al. | 455/412.1 |
| 7,127,400 | B2 | * | 10/2006 | Koch | 704/270.1 |
| 2005/0271188 | A1 | * | 12/2005 | Kraft et al. | 379/88.19 |
| 2006/0148497 | A1 | * | 7/2006 | Fernandez et al. | 455/507 |

* cited by examiner

Primary Examiner — Simon Sing
(74) Attorney, Agent, or Firm — Carmen Patti Law Group, LLC

(57) ABSTRACT

An apparatus in one example has: a mobile switching center having a voice mail system, a subscriber database with voicemail information, and a greetings database; the greetings database having a plurality of lists, and at least one phone number in each of the lists; and the greetings database also having a plurality of recorded greetings, respective greetings in the plurality of recorded greetings being associated with respective lists in the plurality of lists.

18 Claims, 4 Drawing Sheets

NETWORK SUPPORT FOR DISTINCTIVE VOICEMAIL GREETING

TECHNICAL FIELD

The invention relates generally to voice message systems and more specifically to the field of message systems with multiple greeting messages.

BACKGROUND

Within the field of audio telecommunications, there has been a large growth of voice message systems that provide an opportunity for a caller to leave a voice message if the desired recipient, or user, is unavailable. These voice message systems may be either local, supporting a single telecommunication circuit, or they may be network based, supporting multiple telecommunication circuits. A telecommunication circuit includes telephone lines within the Public Switched Telephone Network (PSTN), in addition to other services (e.g. wireless). Typically, a user or recipient will establish a form of voice mailbox, where messages are collected, stored, and maintained according to the recipient's instruction. According to the recipient's instructions, the voice message system will respond to a caller and provide them with various options. Prior to recording a caller's voice message in the voice mailbox, the voice message system typically plays an outgoing announcement greeting.

Today's voice message systems typically provide recipients the ability to manage their announcement and greetings for the purpose of providing a personalized outgoing greeting to incoming callers. Typically, the recorded greeting serves to provide the caller with notification of the recipient's status, i.e. "I am out of the office today and will return on Monday. Please leave your name and number." The voice message system often has the capability to store multiple outgoing greetings, though only one greeting may be active at a time. This active outgoing greeting is typically heard by the calling party, but not by the recipient, unless the recipient calls his or her own number directly, or checks the voice message administration area.

None of the current voice mail systems provide an ability to create multiple voice mail greetings and specify the greeting that should be used for a specific calling party or category of calling parties. Very often people have to travel for vacation or out of town for some reasons but do not have time to inform friends or relatives. Under these situations it's desirable that they be able to inform the necessary people where they can be reached. However, they would not like to provide these details to everyone that calls. There could be calls from telemarketers, sales people, criminals and other people that a person would not want to know that the person out of the house for an extended period or where the person can be reached. It is desirable to have multiple greetings and have the voice mail system play the appropriate greeting depending as a function of the identity of the caller. This way the most trusted friends and family members could be informed about the person's whereabouts and how to reach the person, while the others could simply be told to leave a message or just be disconnected without an opportunity to leave a message.

Thus, there is a need in the art for an improved voice mail system that provides the ability to create and use multiple voice mail greetings.

SUMMARY

The invention in one implementation encompasses an apparatus. The apparatus comprises: a mobile switching center having a voice mail system, a subscriber database with voicemail information, and a greetings database; the greetings database having a plurality of lists, and at least one phone number in each of the lists; and the greetings database also having a plurality of recorded greetings, respective greetings in the plurality of recorded greetings being associated with respective lists in the plurality of lists.

The invention in another implementation encompasses a method. The method comprises: creating at least one list in a voice mail system and specifying at least one phone number in the list; recording at least one greeting in the voice mail system; and associating the at least one greeting with the at least one list.

Another implementation of the invention also encompasses a method. The method comprises: creating a plurality of lists in a voice mail system and specifying a plurality of phone numbers in at least one of the lists; recording a plurality of greetings in the voice mail system; associating respective greetings in the plurality of greetings with respective lists in the plurality of lists; comparing a phone number of a caller with the phone numbers in the lists to determined if the caller is in a respective list; and playing the respective greeting associated with the respective list that contains the phone number of the caller when the phone number of the call is found in one of the lists of the plurality of lists.

DESCRIPTION OF THE DRAWINGS

Features of exemplary implementations of the invention will become apparent from the description, the claims, and the accompanying drawings in which:

DETAILED DESCRIPTION

One methodology according to the present method and apparatus is for the voice mail subscriber to create multiple lists of calling party numbers. The voice mail subscriber may also create multiple voice mail greetings. Another methodology according to the present method and apparatus is for the voice mail subscriber to associate a specific greeting with a specific list. Then the network may identify the associated list for the calling party and play the associated greeting or treatment of the call.

Figure 1:
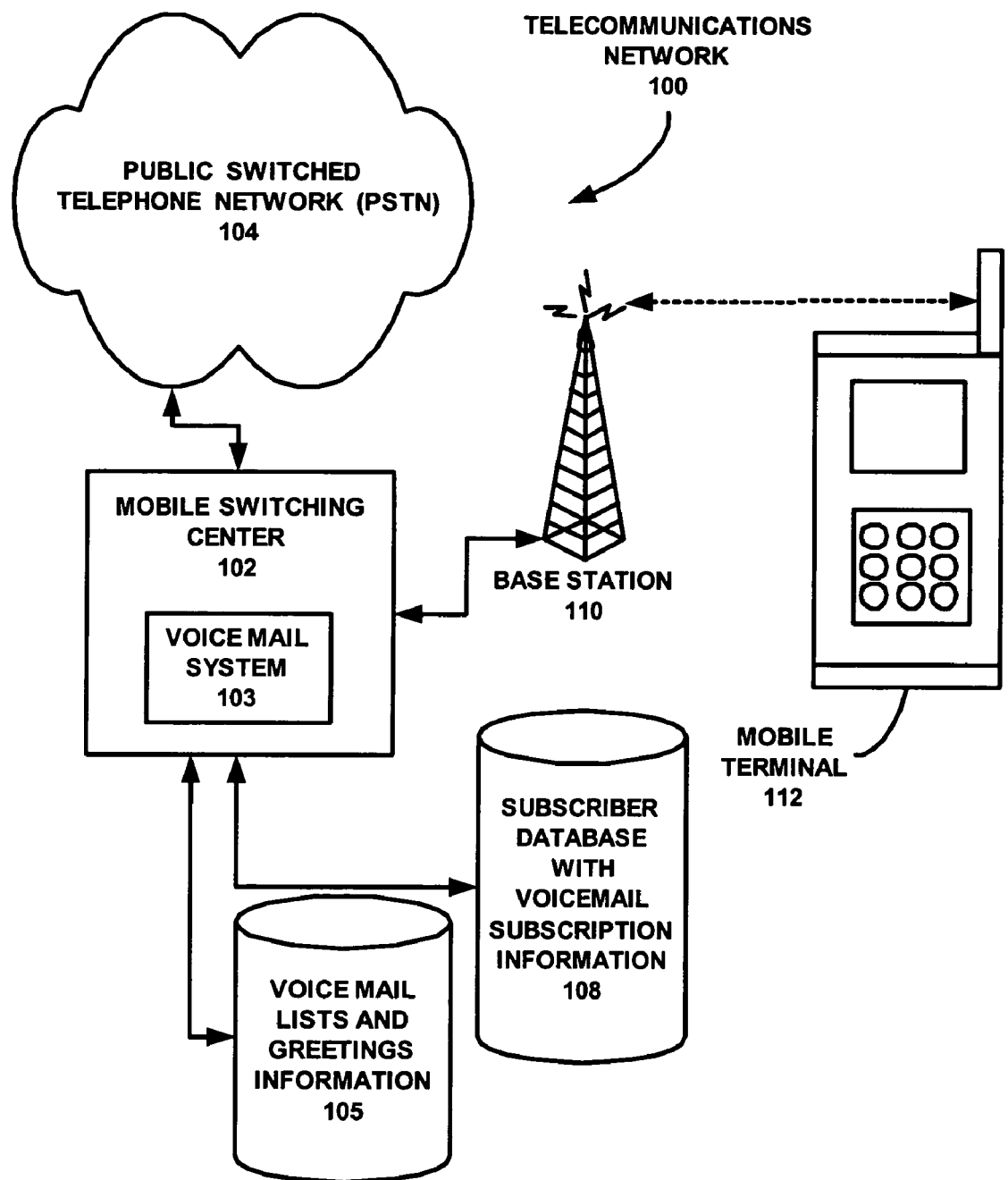
FIG. 1 is a representation of one implementation of an apparatus that provides network support for distinctive voicemail greetings.

FIG. 1 is a representation of one implementation of an apparatus that provides network support for distinctive voicemail greetings.

A telecommunications network 100 may have a mobile switching center (MSC) 102 with a voice mail system 103. The network 100 may be, or may be part of, one or more of a telephone network, a local area network ("LAN"), the Internet, and a wireless network. In the depicted embodiment, a public switched telephone network (PSTN) 104 may be connected to the MSC 102. The PSTN 104 may route calls to and from a mobile terminal 112 through the MSC 102. The MSC 102 may also be connected to at least one base station (BS) 110. The base station 110 communicates with the mobile terminal 112 in its service area using a subscriber database 108. The subscriber database 108 may contain voice mail subscription information. The PSTN 104 generally may be implemented as a worldwide voice telephone network accessible to all those with telephones and access privileges (e.g., AT&T long distance network).

The mobile terminal 112 may be any one of a number of devices, such as a cell phone, a personal data assistant (PDA), a laptop computer, etc.

The mobile switching center 102 may also be operatively coupled to a voice mail greetings database 105 that contains voice mail greetings lists and greeting information.

Figure 2:
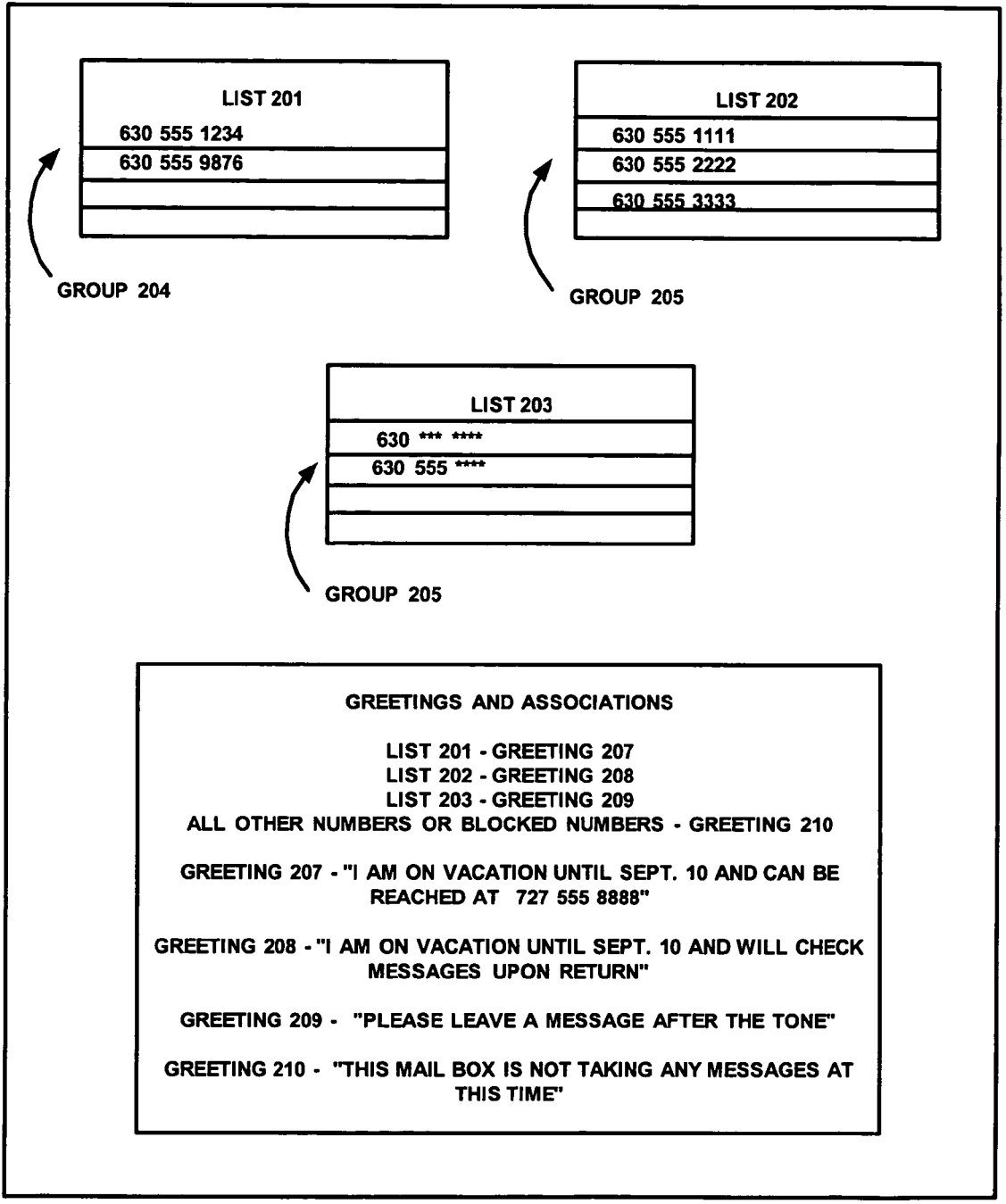
FIG. 2 is a representation of an implementation of subscriber lists for use with the FIG. 1 apparatus.

FIG. 2 is a representation of one example of an implementation of subscriber lists for use with the FIG. 1 apparatus. Each of lists 201, 202 and 203 contain respective phone numbers (such as group 204 in list 201, group 205 in list 202, and group 206 in list 203). Greetings 207, 208, and 209 are associated with lists 201, 202, and 203, respectively. A greeting 210 is stored for use with any phone number not contained in the lists 201, 202, and 203, or for any blocked phone number. Thus, for example, any phone number in list 201 will receive greeting 207. Therefore, the network may identify the associated list for a phone number of a calling party and play the associated greeting. That is, different phone numbers of callers may automatically receive different messages.

Using the network based voice mail system; the subscriber may create multiple lists and specify multiple phone numbers in each list. The phone numbers may optionally be specified using wild card characters. The subscriber may use, for example, the Internet to connect to the voicemail system or may use a voice response system that is built into the voice mail system.

The network based voice mail system may also allow the subscriber to record/create multiple greetings. The network based voice mail system may further allow the subscriber to associate the greetings with the lists created thereby providing a respective greeting of a plurality of greetings to a respective phone number of a plurality of phone numbers.

The network based voice mail system may yet further allow the subscriber to specify the greeting or treatment for phone numbers not specified in any of the lists. The subscriber may choose to; play a greeting and allow the caller to leave messages, play a greeting and not allow the caller to leave messages or just hang up on callers in this category. The treatment for blocked or unknown caller IDs may be the same as phone numbers not specified in any list.

Figure 3:
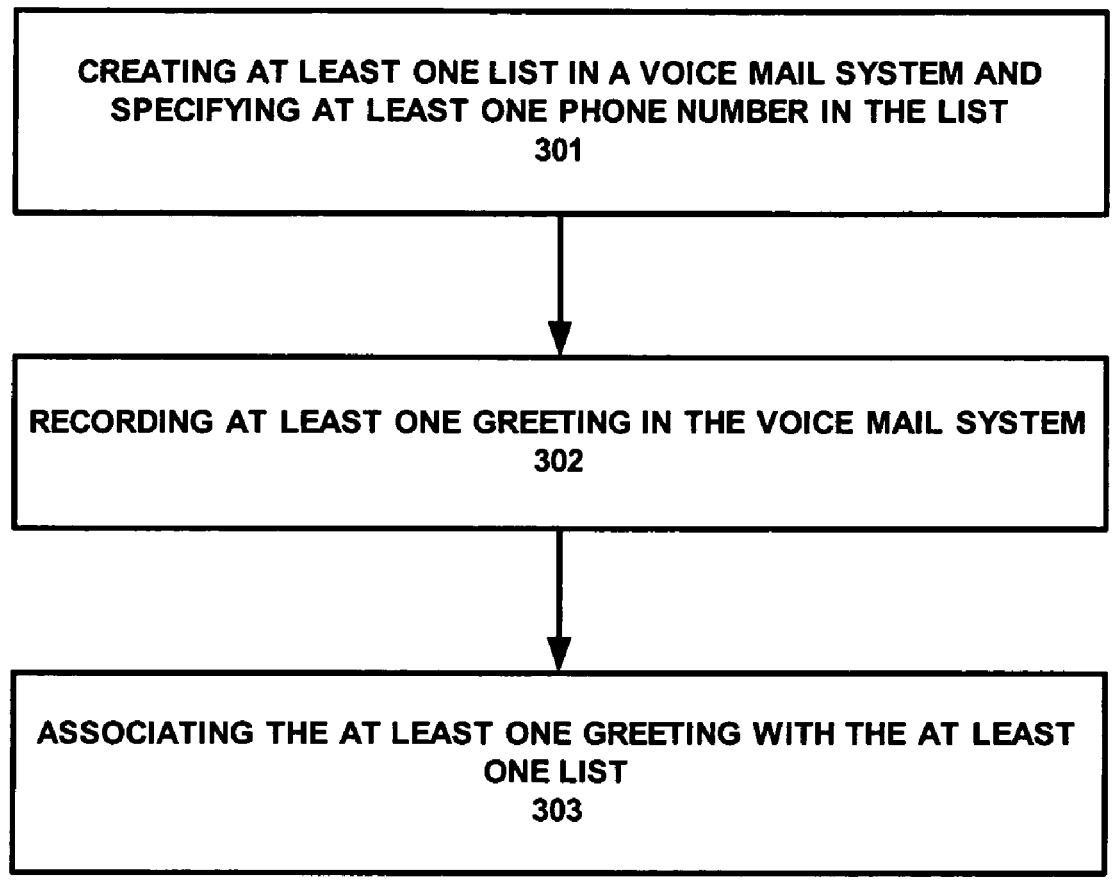
FIG. 3 is a representation of one exemplary flow diagram according to the present method for a voice mail system that provides the ability to create and use multiple voice mail greetings.

FIG. 3 is a representation of one exemplary flow diagram for providing network support for distinctive voicemail greetings according to the present method. In this embodiment of the present method, the method may comprise: creating at least one list in a voice mail system and specifying at least one phone number in the list (301); recording at least one greeting in the voice mail system (302); and associating the at least one greeting with the at least one list (303).

Figure 4:
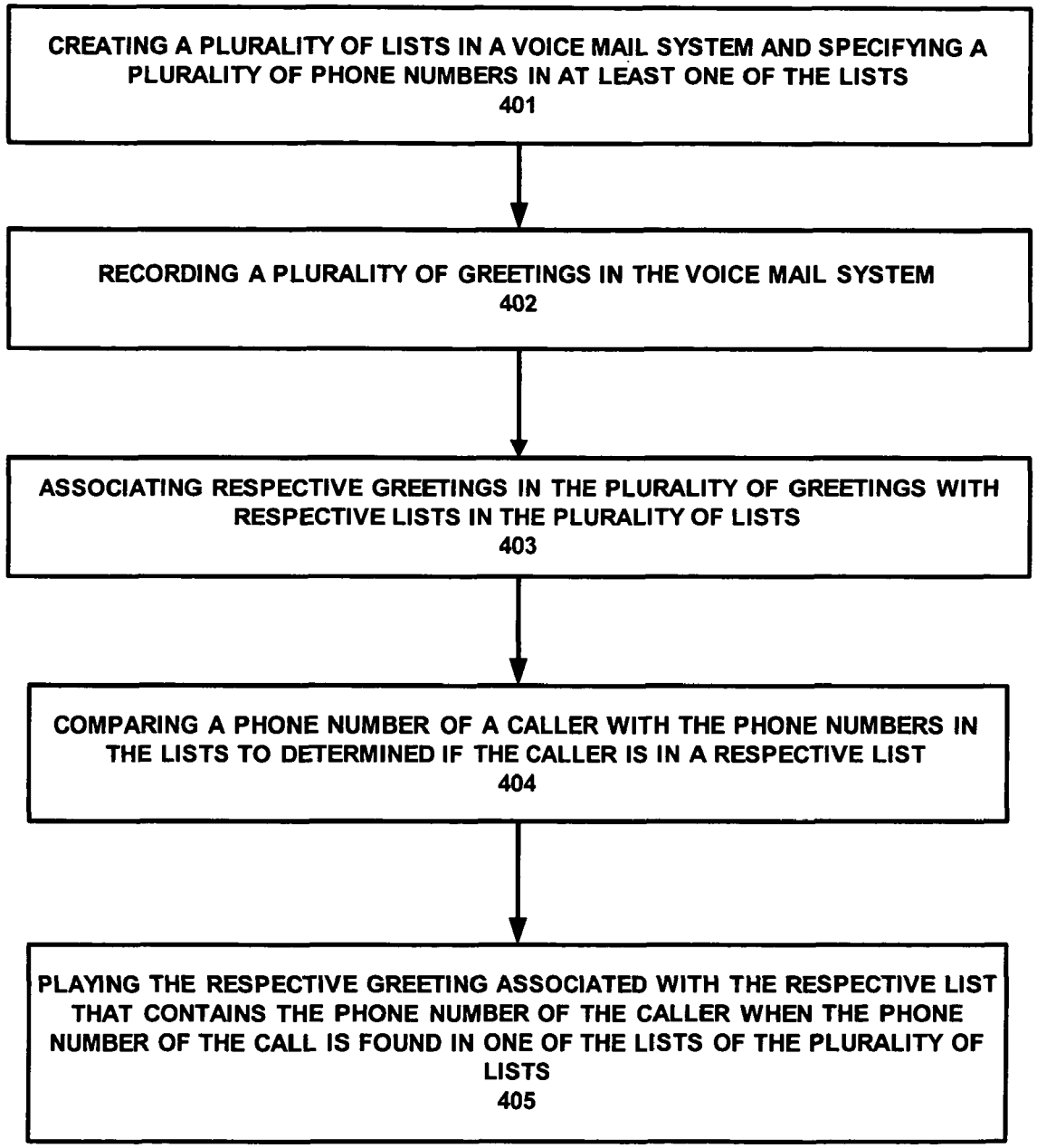
FIG. 4 is a representation of another exemplary flow diagram according to the present method for a voice mail system that provides the ability to create and use multiple voice mail greetings.

FIG. 4 is a representation of another exemplary flow diagram according to the present method for a voice mail system that provides the ability to create and use multiple voice mail greetings. This method may have the steps of: creating a plurality of lists in a voice mail system and specifying a plurality of phone numbers in at least one of the lists (401); recording a plurality of greetings in the voice mail system (402); associating respective greetings in the plurality of greetings with respective lists in the plurality of lists (403); comparing a phone number of a caller with the phone numbers in the lists to determined if the caller is in a respective list (404); and playing the respective greeting associated with the respective list that contains the phone number of the caller when the phone number of the call is found in one of the lists of the plurality of lists (405).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus for use in a wireless network, comprising:
   a mobile switching center having a voice mail system that is contained completely in the mobile switching center, a subscriber database with voicemail information, and a greetings database;
   the greetings database having a plurality of lists, and at least one phone number in each of the lists; and
   the greetings database also having a plurality of recorded greetings, respective greetings in the plurality of recorded greetings being associated only with respective lists in the plurality of lists such that a predetermined respective greeting of a plurality of recorded greetings is played for each respective phone number of a respective list of phone numbers, a respective recorded greeting being played for an associated incoming call without a necessary request from the associated incoming call;
   wherein the voice mail system is configured to only associate respective recorded greetings with respective lists; and
   wherein the voice mail system is accessed by a subscriber using an Internet connection whereby the subscriber creates said lists and recorded greetings, associates respective greetings with respective lists and specifies treatment of phone numbers not included in any of the lists as well as treatment of phone numbers that are blocked or that are unknown caller IDs, by choosing from at least three options including play a greeting and allow a caller to leave messages, play a greeting and not allow a caller to leave messages, and hanging up on a caller.

2. The apparatus according to claim 1, wherein the apparatus further comprises a plurality of phone numbers in at least one of the lists.

3. The apparatus according to claim 1, wherein a Voice response system that is built into the voice mail system is used to connect to the voicemail system for recording greetings.

4. The apparatus according to claim 1, wherein the phone numbers are specified using wild card characters.

5. The apparatus according to claim 1, wherein one of a respective greeting or a predetermined treatment is stored in the voice mail system for phone numbers not specified in any list.

6. The apparatus according to claim 5, where, for phone numbers not specified in any list, the voice mail system is structure to treat blocked or unknown caller IDs the same as phone numbers not specified in any list.

7. A method for use in a wireless network, comprising:
creating at least one list in a voice mail system and specifying at least one pone number in the list, the voice mail system being contained completely in a mobile switching center;
recording at least one greeting in the voice mail system; and
associating the at least one greeting only with the at least one list such that a predetermined respective greeting of a plurality of recorded greetings is played for each respective phone number of a respective list of phone numbers, a respective recorded greeting being played for an associated incoming call without a necessary request from the associated incoming call;
wherein the voice mail system operates such that respective recorded greetings are only associated with respective lists; and
wherein the voice mail system is accessed by a subscriber using an Internet connection whereby the subscriber may creates said lists and recorded greetings, associates respective greetings with respective lists and specifies treatment of phone numbers not included in any of the lists as well as treatment of phone numbers that are blocked or that are unknown caller IDs, by choosing from at least three options including play a greeting and allow a caller to leave messages, play a greeting and not allow a caller to leave messages, and hanging up on a caller.

8. The method according to claim 7, wherein the method further comprises creating a plurality of lists, and specifying at least one phone number in each of the lists.

9. The method according to claim 8, wherein the method further comprises specifying a plurality of phone numbers in at least one of the lists.

10. The method according to claim 9, wherein the phone numbers are specified using wild card characters.

11. The method according to claim 7, wherein a voice response system that is built into the voice mail system is used to connect to the voice mail system.

12. The method according to claim 7, wherein voice mail system is network based and allows for recording/creating multiple greetings.

13. The method according to claim 7, wherein the greetings are respectively associated with the lists.

14. The method according to claim 7, wherein the method further comprises specifying one of the greeting or a predetermined treatment for phone numbers not specified in any list.

15. The method according to claim 14, wherein the method further comprises treatment for blocked or unknown caller IDs being the same as phone numbers not specified in any list.

16. A method for use in a wireless network, comprising:
creating a plurality of lists in a voice mail system and specifying a plurality of phone numbers in at least one of the lists, the voice mail system being contained completely in a mobile switching center;
recording a plurality of greetings in the voice mail system;
associating respective greetings in the plurality of greetings only with respective lists in the plurality of lists;
comparing a phone number of a caller with the phone numbers in the lists to determined if the caller is in a respective list; and
playing the respective greeting associated with the respective list that contains the phone number of the caller when the phone number of the call is found in one of the lists of the plurality of lists;
wherein a predetermined respective greeting of a plurality of recorded greetings is played for each respective phone number of a respective list of phone numbers, a respective recorded greeting being played for an associated incoming call without a necessary request from the associated incoming call;
wherein the voice mail system operates such that respective recorded greetings are only associated with respective lists; and
wherein the voice mail system is accessed by a subscriber using an Internet connection whereby the subscriber may creates said lists and recorded greetings, associates respective greetings with respective lists and specifies treatment of phone numbers not included in any of the lists as well as treatment of phone numbers that are blocked or that are unknown caller IDs by choosing from at least three options including play a greeting and allow a caller to leave messages, play a greeting and not allow a caller to leave messages, and hanging up on a caller.

17. The method according to claim 16, wherein the method further comprises specifying one of the greetings or a predetermined treatment for phone numbers not specified in any list of the plurality of lists.

18. The method according to claim 17, wherein the method further comprises treatment for blocked or unknown caller IDs being the same as phone numbers not specified in any list.

* * * * *